US006366397B1

United States Patent
Genjima et al.

(10) Patent No.: US 6,366,397 B1
(45) Date of Patent: Apr. 2, 2002

(54) INFRARED RADIATION REFLECTOR AND INFRARED RADIATION TRANSMITTING COMPOSITION

(75) Inventors: Yasuhiro Genjima; Haruhiko Mochizuki, both of Hidaka (JP)

(73) Assignee: NTT Advanced Technology Corporation, Tokyo (JP)

( * ) Notice: Subject to any disclaimer, the term of this patent is extended or adjusted under 35 U.S.C. 154(b) by 0 days.

(21) Appl. No.: 09/523,451

(22) Filed: Mar. 10, 2000

(51) Int. Cl.⁷ ................................................ F21V 9/04
(52) U.S. Cl. .......................................................... 359/359
(58) Field of Search ................................. 359/350, 360, 359/359; 428/424.6, 403, 324

(56) References Cited

U.S. PATENT DOCUMENTS 4,598,015 A * 7/1986 Panush ........................ 428/324
4,916,014 A * 4/1990 Weber et al. ................ 428/403
5,547,501 A * 8/1996 Maruyama ................... 106/21

* cited by examiner

Primary Examiner—Cassandra Spyrou
Assistant Examiner—Alessandro V. Amari
(74) Attorney, Agent, or Firm—Burns Doane Swecker & Mathis LLP

(57) ABSTRACT

The infrared reflector of the present invention has an infrared-reflecting layer and an infrared-permeable layer which is formed on the infrared-reflecting layer. The infrared-reflecting layer has a reflectance of 60% or more and a permeability of 25% or less with respect to infrared rays having a wavelength within a range of 800 to 2600 nanometers. The infrared-permeable layer has a reflectance of less than 60%, an absorbance of 50% or less, and a permeability of 30% or more with respect to infrared rays having a wavelength within a range of 800 to 2600 nanometers. The infrared-permeable layer contains resin components and pigments, and the amount of carbon black contained in the infrared-permeable layer is 0.1 wt % or less.

7 Claims, 1 Drawing Sheet

INFRARED RADIATION REFLECTOR AND INFRARED RADIATION TRANSMITTING COMPOSITION

BACKGROUND OF THE INVENTION

1. Field of the Invention

The present invention relates to an infrared reflector which reflects infrared rays contained in sunlight and the like, as well as to a composition for forming an infrared-permeable layer which may be used in the manufacture of the infrared reflector.

2. Background Art

Common paints contain carbon black as a portion of the pigment thereof, and the degree of brightness is adjusted by the amount of this carbon black which is contained. However, when common paints which contain carbon black in this way are employed in the painting of structures which are installed outdoors, the temperature of the structure rises as a result of sunshine, and the possibility has come to be pointed out that this leads to irregularities in the operation of precision mechanical equipment.

Here, recently, paints having a strong effect of reflecting infrared rays have also been proposed. Conventional infrared-reflecting paints are paints to which a metallic oxide system pigment having a high reflectance of infrared rays, such as titanium oxide, chromium oxide, cobalt oxide, barium oxide, and the like, has been added, and by applying such paints to the target object and forming a paint film having a monolayer structure, infrared rays were reflected.

When the color of such infrared-reflecting paints was bright, it was possible to increase the amount of metallic oxide system pigment contained, and it was thus possible to increase the reflectance of the infrared rays and to suppress the increase in temperature resulting from the infrared rays; however, where the color of the paint was dark, it was necessary to reduce the proportion of the metallic oxide system pigment which represented the bright color, and reflectance decreased by this amount, and there was an increase in the rise in temperature resulting from infrared rays. Accordingly, there were problems in that the range of colors which could be produced was narrow, and in particular, there was a limit to the brightness of the color, and in usages requiring design characteristics, these are serious defects.

It is an object of the present invention to provide an infrared reflector which has superior infrared-reflecting characteristics, has a wide range of possible colors, from colors having a high degree of brightness to colors having a low degree of brightness, and which permits a high degree of design freedom, as well as to provide a composition for forming an infrared-permeable layer which may be used in the manufacture of the infrared reflector.

SUMMARY OF THE INVENTION

In order to attain the above object, the infrared reflector of the present invention has an infrared-reflecting layer and an infrared-permeable layer which is formed on this infrared-reflecting layer, and the infrared-reflecting layer has a reflectance of 60% or more, and a permeability of 25% or less (more preferably 10% or less) with respect to infrared rays having a wavelength within a range of 800 to 2600 nanometers, and the infrared-permeable layer has a reflectance of less than 60%, an absorbance of 50% or less, and a permeability of 30% or more (more preferably 50% or more) with respect to infrared rays having a wavelength of 800 to 2600 nanometers; the infrared-permeable layer contains resin components and pigments, and the amount of carbon black contained in the infrared-permeable layer is 0.1 wt % or less.

The infrared-reflecting layer may contain, in an amount within a range of 5 to 80 wt %, one or two or more selected from a group containing iron oxide powder, titanium oxide powder, scaly aluminum powder, stainless steel powder, and mica powder covered with titanium oxide, in addition to resin components.

Furthermore, the infrared-reflecting layer may be a metal layer, a white-colored glass layer, or a white-colored ceramic layer. This metal layer may be a metal film formed on the surface of a base member by plating, sputtering, vacuum deposition, ion plating, or the like. The material of the base member is not restricted; it is possible to use metal, glass, ceramic, plastic, concrete, wood, or the like.

The infrared reflector of the present invention has a structure with at least two or more layers, and the amount of carbon black employed in the pigment which strongly absorbs infrared rays having a wavelength within a range of 800 to 2600 nanometers, among the infrared rays contained in sunlight, is made extremely small. By means of this, because the absorption of infrared rays at the upper layer which serves to obtain the desired color is suppressed, while the infrared rays are reflected at the infrared-reflecting layer which is the bottom layer, despite the, fact that the range of colors possible is broad, the infrared reflectance is high. Accordingly, it is possible to apply this to the surfaces of various products and structures, and it is possible to effectively suppress the increase in temperature thereof.

The composition for forming an infrared-permeable layer of the present invention contains a resin component and pigments having an absorbance of 50% or less with respect to infrared rays having a wavelength within a range of 800 to 2600 nanometers, and the amount of carbon black contained therein is 0.1 wt % or less.

The "infrared absorbance of the pigment" referred to in the present specification is a numerical value resulting from dispersing 5 wt % of the pigment in an acrylic resin, which is a resin for paint, and forming a film having a thickness of 20 micrometers, and measuring the absorbance with respect to infrared rays having a wavelength within a range of 800 to 2600 nanometers.

By providing a coating layer on the infrared-reflecting layer having a high infrared reflectance using the composition for forming an infrared-permeable layer of the present invention, it is possible to realize a variety of colors including dark colors, while maintaining the overall high infrared reflectance.

DETAILED DESCRIPTION OF THE PREFERRED EMBODIMENTS

[Composition for Forming Infrared-Permeable Layer]

Figure 1:
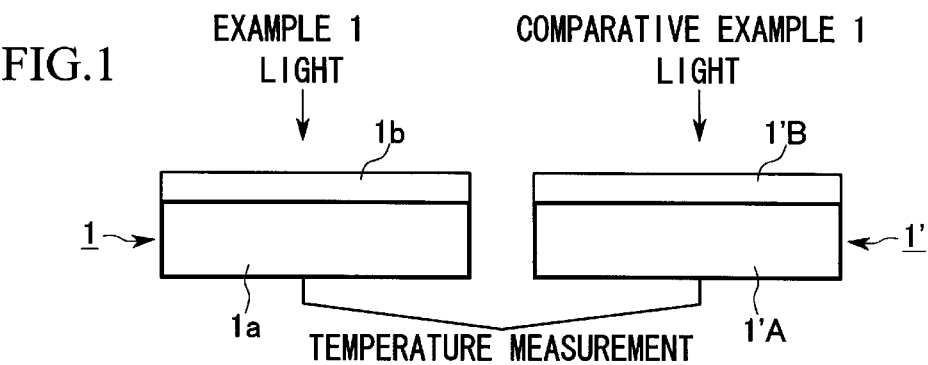
FIGS. 1 through 4 are explanatory diagrams showing the experiment methods of the embodiments of the present invention and Comparative Examples.

The composition for forming an infrared-permeable layer of the present invention contains a resin component and pigments having an absorbance of 50% or less with respect to infrared rays having a wavelength within a range of 800 to 2600 nanometers, and contains 0.1 wt % or less of carbon black. This composition for forming an infrared-permeable layer may be a liquid or powdered paint, or in the shape of a film, or may be the wall materials or panels forming the surfaces of the product.

In the present invention, carbon black, which strongly absorbs the infrared rays having a wavelength within a range of 800 to 2600 nanometers, which particularly strongly contribute to the generation of heat among the infrared rays contained in sunlight, is used in small amounts or is not used at all, and thereby, the absorption of infrared rays is suppressed. On the other hand, by employing a pigment which fulfills the conditions described above as the coloring agent, it is possible to produce a variety of colors while suppressing the absorption of the infrared rays. As the amount of carbon black contained decreases, the infrared absorption decreases, and the amount of carbon black contained is preferably 0.05 wt % or less, and more preferably 0 wt %.

It is possible to employ a variety of varnishes (oil varnish and/or spirit varnish), resins for use in paints, common plastics, and engineering plastics as the resin component; however, in any case, it is necessary that there be little absorption of infrared rays. It is preferable that the infrared absorbance of the resin component be 10% or less with respect to infrared rays having a wavelength within a range of 800 to 2600 nanometers. In the present specification, "infrared absorbance of the resin component" is a numerical value in which a film having a thickness of 20 micrometers is produced using this resin component, and the absorbance with respect to infrared rays having a wavelength within a range of 800 to 2600 nanometers is measured.

Examples of the resin for paints include, for example, alkyd resins, phthalic acid resins, vinyl resins, acrylic resins, fluorine resins, polyamide resins, unsaturated polyester resins, chlorinated polyolefin resins, amino resins, polyurethane resins, silicone resins, acrylic-silicone resins, silicone-acrylic resins, xylene resins, petroleum resins, ketone resins, liquid polybutadiene, rosin-denatured maleic acid resins, coumarone resin, ethyl silicate, resin for powdered paints, resin for ultraviolet ray curing, epoxy resin, olefin resin, phenol resin, and the like. It is also possible to use water-soluble resin. Among these, acrylic resin, polyurethane resin, acrylic-silicone resin, silicone-acrylic resin, fluorine resin, and the like, have little absorption of infrared rays, and have superior dispersion properties in the infrared-permeable pigment, and for these reasons they are preferable.

Furthermore, examples of the common and engineering plastics include, for example, polyethylene resin, ethylene-vinyl acetate copolymer resin, polypropylene resin, polystyrene resin, AS resin, ABS resin, methacrylic resin, polyvinyl chloride resin, polyamide resin, polycarbonate resin, polyethylene terephthalate resin, polybutylene terephthalate resin, diallylphthalate resin, urea resin, melamine resin, xylene resin, phenol resin, unsaturated polyester resin, epoxy resin, furan resin, polybutadiene resin, polyurethane resin, melamine phenol resin, chlorinated polyethylene resin, vinylidene chloride resin, acrylic-vinyl chloride copolymer resin, AAS resin, ACS resin, polyacetal resin, polymethylpentene resin, polyphenylene oxide resin, denatured PPO resin, polyphenylene sulfide resin, butadiene styrene resin, polyamino bismaleimide resin, polysulfone resin, polybutylene resin, silicone resin, polyethylene tetrafluoride resin, polyethylene fluoride propylene resin, perfluoro alkoxy fluoride plastic, polyvinylidene fluoride resin, MBS resin, methacrylic-styrene resin, polyimide resin, polyallylate resin, polyallylsulfone resin, polyethersulfone resin, polyether etherketone resin, and the like. Among these, ABS resin, polycarbonate resin, unsaturated polyester resin, polypropylene resin, denatured PPO resin, polyamide resin, and the like, are preferable in that pigments are easily dispersed in them.

Either inorganic pigments or organic pigments may be employed as the pigment contained in the composition for forming an infrared-permeable layer. Inorganic pigments which may be employed include, for example, iron oxide pigments, titanium oxide pigments, composite oxide system pigments, titanium oxide-coated mica pigments, iron oxide-coated mica pigments, scaly aluminum pigments, zinc oxide pigments, and the like.

Examples of the organic pigment which may be employed include, for example, copper phthalocyanine pigment, dissimilar metal (nickel, cobalt, iron, or the like) phthalocyanine pigment, non-metallic phthalocyanine pigment, chlorinated phthalocyanine pigment, chlorinated-brominated phthalocyanine pigment, brominated phthalocyanine pigment, anthraquinone, quinacridone system pigment, diketo-pyrrolipyrrole system pigment, perylene system pigment, monoazo system pigment, diazo system pigment, condensed azo system pigment, metal complex system pigment, quinophthalone system pigment, Indanthrene Blue pigment, dioxadene violet pigment, anthraquinone pigment, metal complex pigment, benzimidazolone system pigment, and the like. Additionally, pigments having little infrared absorption may be employed.

In particular, when a dark color is to be produced, azomethine system organic pigments such as the "A-1103 Black" trademarked product produced by Dainichiseika Color & Chemicals Mfg. Co., Ltd., and perylene system pigments such as the "Perylene Black S-0084" trademarked product produced by BASF Corporation, are optimal as black pigments which substitute for carbon black, and these may be dispersed in the resin component either singly or in combination with other pigments. The amount contained thereof is preferably within a range of 0.01 to 80 wt %, and more preferably within a range of 0.1 to 30 wt %.

When the absorbance of the coloring pigment with respect to infrared rays having a wavelength within a range of 800 to 2600 nanometers is greater than 50%, then the degree of freedom in the color decreases. It is more preferable that the infrared absorbance be 30% or less.

The amount of coloring pigment contained is not limited; however, an amount within a range of 5 to 80 wt % is preferable, and an amount within a range of 10 to 30 wt % is more preferable. It is preferable that the average grain diameter of the pigment be within a range of 0.01 to 30 micrometers, and a range of 0.05 to 1 micrometer is more preferable. Within these ranges, it is possible to increase the ultimate infrared reflectance when the reflector described hereinbelow is formed, and the dispersion properties are also good.

When the composition for forming an infrared-permeable layer of the present invention is a paint, in order to simplify the application operation, it may be diluted with appropriate solvents, for example, organic solvents, water, or mixtures of water and organic solvents. Furthermore, where necessary, a dispersing agent or dispersing assistant may be added to the solvent.

[Infrared Reflector]

The composition for forming an infrared-permeable layer described above is used for the purpose of coating an infrared-reflecting layer having a reflectance of 60% or more with respect to infrared rays having a wavelength within a range of 800 to 2600 nanometers, and forms an infrared-permeable layer as a coloring layer and a protective layer. By means of this infrared reflector having a two-layer structure, the infrared rays which pass through the infrared-permeable layer, which is the coloring layer, are reflected by the infrared-reflecting layer which is beneath, and again pass through the infrared-permeable layer and escape to the exterior, so that it is possible to suppress the rise in temperature of covered structures and the like at a low level. Furthermore, by selecting a pigment from those described above which has a desired color as the pigment for the infrared-permeable layer, it is possible to provide the required color and design. That is to say, an infrared-reflecting function is primarily obtained by the lower layer, while the design characteristics are improved by the upper layer. Additionally, the reflective layer, which is the lower layer, is protected by the upper layer, so that it is possible to cause the infrared-reflecting properties to continue in a stable fashion over a long period of time.

The infrared-reflecting layer described above has a reflectance of 60% or more and a permeability of 25% or less with respect to infrared rays having a wavelength within a range of 800 to 2600 nanometers, and more preferably, the permeability is 10% or less. When the permeability is greater than 25%, the reflectance of the reflector declines. Reflectance, permeability, and absorbance as used herein refer to numerical values obtained by a measurement of all layers; these measurements may be made using the automatic recording spectrophotometer "U-4000" produced by Hitachi Seisakujo, for example. The measurement of the reflection may be conducted under conditions of, for example, 5% mirror reflection.

The infrared-permeable layer described above has a reflectance of less than 60%, an absorbance of 50% or less, and a permeability of 30% or more with respect to infrared rays having a wavelength within a range of 800 to 2600 nanometers. When the absorbance is greater than 50%, or the permeability is less than 30%, the reflectance as a reflector declines. It is preferable that the permeability be 50% or more.

It is possible to use a layer formed from a resin composition having as a coloring component thereof an infrared-reflecting pigment having the characteristics of efficiently reflecting infrared rays and efficiently emitting extreme infrared rays as the infrared-reflecting layer. One or two or more selected from a group containing iron oxide pigment, titanium oxide pigment, composite oxide system pigment, titanium oxide-coated mica pigment, iron oxide-coated mica pigment, scaly aluminum pigment, and zinc oxide pigment may be employed as this type of infrared-reflecting pigment. Among these, titanium oxide is preferable from the point of view of reflective properties and cost. The infrared reflective pigment may contain an azomethine organic pigment such as the "A-1103 Black" trademarked product produced by Dainichiseika Color & Chemicals Mfg. Co., Ltd. or a perylene system pigment such as the "Perylene Black S-0084" trademarked product produced by BASF Corporation.

The amount of pigment contained in the infrared reflective layer is not limited; however, an amount in a range of 5 to 80 wt % is preferable, and 40 to 80 wt % is more preferable.

The average grain diameter of the pigment in the infrared reflective layer is preferably within a range of 0.01 to 100 micrometers, and more preferably within a range of 0.1 to 25 micrometers. In particular, when titanium oxide is employed, that having a grain diameter within a range of 0.05 to 1 micrometer is preferable from the point of view of the reflective properties.

When titanium oxide is employed in the infrared reflective layer, if scaly aluminum pigment, mica pigment, or the like is added, an even higher reflectance may be obtained. The infrared reflective layer is not limited to one layer; two or more layers may be employed.

Where necessary, extender pigment having infrared reflective properties, such as silica, magnesium silicate, calcium carbonate, or the like, may be added to the infrared reflective layer and the infrared-permeable layer, and the gloss may be adjusted. The amount of extender pigment contained is not limited; however, it is preferable that this be 25 wt % or less of each layer.

The infrared-permeable layer is also not limited to one layer; this may comprise two or more layers, such as a transparent layer which chiefly carries out a protective function and a design layer containing a concentration of coloring components. Furthermore, the infrared reflective layer may be a molded product comprising the resins described above, or may be a product in which functional parts or the like are resin-molded.

Furthermore, the infrared reflective layer may be metal, white glass, white ceramic, or one in which a metal film is formed on the surface of a base member. In this case, it is preferable that the surface of the infrared reflective layer be made a mirrored surface. The metal layer described above may be a metal film formed by plating, sputtering, vacuum deposition, ion plating, or the like on the surface of a base member. The material of the base member is not limited; it is possible to use, for example, metal, glass, ceramic, plastic, concrete, wood, or the like.

EXAMPLES

Hereinbelow, the effects will be demonstrated using examples of the present invention. The present invention is not restricted to the structure of the examples given hereinbelow.

Example 0

Composition for Forming an Infrared-Permeable Layer

The following raw materials were mixed in advance in a mixer, and after this, were dispersed uniformly in a sand mill, and thereby, a composition for forming an infrared-permeable layer was prepared.

Acrylic varnish (solid component 50%): 68.0 parts by weight

Perylene Black S-0084 (produced by BASF Corporation): 3.0 parts by weight

Shimura First Yellow 4192 (produced by Dainippon Ink and Chemicals, Inc.): 1.0 parts by weight Chromophthal Red 6820 (produced by.Dainichiseika Color & Chemicals Mfg. Co., Ltd.): 0.2 parts by weight Mixed solution of toluene 5/xylene 10: 27.8 parts by weight The color of this pigment composition is SYR2/1.5 when expressed in Munsell notation, and it appears dark brown.

Example 1

Infrared Reflector

As an infrared reflective layer, 60 parts by weight of ABS resin and 40 parts per weight of the titanium oxide "FR 41" (produced by Furukawa Kougyou K.K., average grain diameter 0.2 micrometers, purity 94%) were heated and kneaded, molded into a plate having a thickness of 3 millimeters, and the white ABS resin plate 1a shown in FIG. 1 was prepared.

The composition for forming an infrared-permeable layer obtained in Example 0 was diluted using thinner to a viscosity capable of spraying, and spray application was conducted using an air spray gun onto the ABS resin plate 1a described above, this was dried for 10 minutes at room temperature, and was then dried for 30 minutes at 80° C., and a coating layer 1b having a thickness of approximately 25 micrometers was formed as an infrared-permeable layer, and thus a dark brown infrared reflector 1 was obtained.

Example 2

Infrared Reflector 50 parts by weight of an acrylic varnish (with a solid component of 60%), 25 parts by weight of the titanium oxide "FR 41" (produced by Furukawa Kougyou K.K.), and 25 parts by weight of a mixed solution of toluene 10/xylene 15, were mixed and agitated in advance, and were then uniformly dispersed using a sand mill, and thus a paint for forming an infrared reflective layer was prepared.

Figure 2:
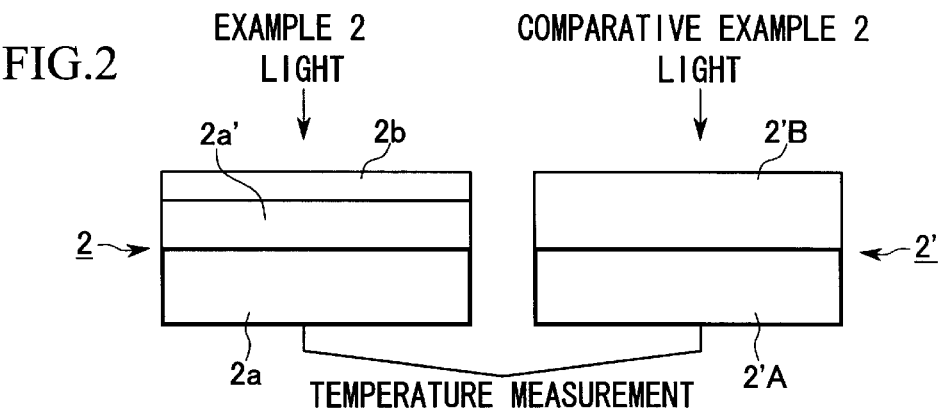

Next, this paint was diluted using a thinner, and was adjusted to a sprayable viscosity, and spray application was conducted using an air spray gun onto the smoothly polished mirror surface of a iron plate 2a having a thickness of 3 millimeters, and this was dried for 10 minutes at room temperature, and for 30 minutes at 80° C., and an infrared reflective layer 2a' having an average coating film thickness of 25 micrometers such as that shown in FIG. 2 was prepared.

The composition for forming an infrared-permeable layer produced in Example 0 was diluted using a thinner to a sprayable viscosity, and spray application was conducted onto the infrared reflective layer 2a' using an air spray gun, and this was dried for 10 minutes at room temperature and for 30 minutes at 80° C., and an infrared-permeable layer 2b (with an average thickness of 25 micrometers) was formed, and thus a dark brown infrared reflector 2 was obtained.

Example 3

Infrared Reflector

Figure 3:
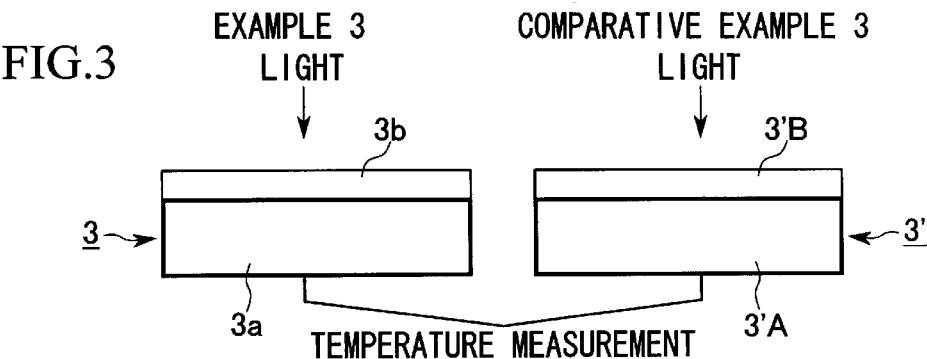

As shown in FIG. 3, an aluminum plate 3a having a thickness of 3 millimeters and a smoothly polished mirrored surface was prepared as the infrared reflective layer.

The composition for forming an infrared-permeable layer produced in Example 0 was diluted using thinner to a sprayable viscosity, and spray application was conducted onto the smoothly polished surface of the aluminum plate 3a using an air spray gun, and this was dried for 10 minutes at room temperature and for 30 minutes at 80° C., and an infrared-permeable layer 3b (with an average thickness of 25 micrometers) was formed, and thus a dark brown infrared reflector 3 was obtained.

Example 4

Infrared Reflector

Figure 4:
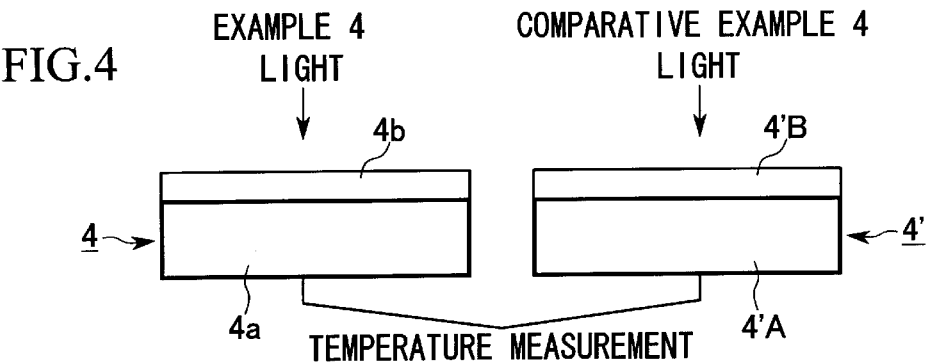

As shown in FIG. 4, a stainless steel plate 4a having a thickness of 3 millimeters and with a smoothly polished mirrored surface was prepared as the infrared reflective layer.

The composition for forming an infrared-permeable layer produced in Example 0 was diluted using thinner to a sprayable viscosity, and spray application was conducted onto the smoothly polished surface of the stainless steel plate 4a using an air spray gun, and this was dried for 10 minutes at room temperature, and for 30 minutes at 80° C., and an infrared-permeable layer 4b (with an average thickness of 25 micrometers) was formed, and thus an infrared reflector 4 was obtained.

Comparative Example 0

Paint Composition

The following raw materials were agitated in a mixer, and after this, were uniformly dispersed in a sand mill, and the paint of Comparative Example 0 was prepared.

Acrylic varnish (solid component 50%): 68.0 parts by weight

Carbon black FW200 (produced by Degusa Corporation): 1.0 parts by weight

Shimura First Yellow 4192 (produced by Dainippon Ink and Chemicals Corporation): 2.0 parts by weight Chromophthal Red 6820 (produced by Dainichiseika Color & Chemicals Mfg. Co., Ltd.): 1.0 parts by weight Mixed solution of toluene 5/xylene 10: 28.0 parts by weight The color of this paint composition was the same of that of Example 0, and was 5YR2-1.5 when expressed in Munsell notation, and appeared dark brown.

Comparative Example 1

Ifrared Reflector

The paint composition of Comparative Example 0 was diluted using a thinner to a sprayable viscosity, and spray application thereof was conducted using an air spray gun onto a commercially available gray ABS resin plate 1'A having a thickness of 3 millimeters, and this was dried for 10 minutes at room temperature and for 30 minutes at 80° C., and the infrared reflective film 1'B having a thickness of approximately 25 micrometers shown in FIG. 1 was formed, and thus the dark brown infrared reflector 1' of Comparative Example 1 was prepared.

Comparative Example 2

Infrared Reflector

As shown in FIG. 2, the paint composition of Comparative Example 0 above was diluted using a thinner to a sprayable viscosity, and spray application thereof was conducted using an air spray gun onto an iron plate 2'A identical to that of Example 2, and this was dried for 10 minutes at room temperature and for 30 minutes at 80° C., and a paint coating film 2'B having an average thickness of 45 micrometers was formed, and thus a dark brown infrared reflector 2' was prepared. The thickness was equal to the total thickness of the infrared-reflective layer and infrared-permeable layer of the infrared reflector of Example 2.

Comparative Example 3

Infrared Reflector

The paint composition of Comparative Example 0 was diluted using a thinner to a sprayable viscosity, and spray application thereof was conducted using an air spray gun onto an aluminum plate 3'A identical to that of Example 3 such as that shown in FIG. 3, and this was dried for 10 minutes at room temperature and for 30 minutes at 80° C., and a coating film 3'B having an average thickness of 25 micrometers was formed, and thus a dark brown infrared reflector 3' was prepared. The thickness thereof was equivalent to the thickness of the infrared reflector of Example 3.

Comparative Example 4

Infrared Reflector

As shown in FIG. 4, the paint composition of the Comparative Example described above was diluted using a thinner to a sprayable viscosity, and the spray application thereof was conducted using an air spray gun onto a stainless steel plate 4'A identical to that of Example 4, and this was dried for 10 minutes at room temperature and for 30 minutes at 80° C., and a coating film 4'B having an average thickness of 25 micrometers was formed, and thus a dark brown infrared reflector 4' was prepared. The thickness thereof was equivalent to the thickness of the infrared reflector of Example 4.

[Experiments 1 to 4]

The infrared reflectors of Examples 1 through 4 and Comparative Examples 1 through 4 were arranged in the same horizontal plane within a box made of white foam styrene with a thickness of 20 millimeters, the box having dimensions of 250 millimeters length by 360 millimeters width by 60 millimeters height, and the box was covered with a transparent glass plate having a thickness of 3 millimeters so as to eliminate wind effects, and was placed in sunshine outdoors, and the temperature on the rear surface of each infrared reflector was measured.

The table shows the temperatures immediately before the application of sunlight, and at 15 minutes, 30 minutes, 45 minutes, 60 minutes, and 75 minutes thereafter. As can be seen from the experiment, in the interval from 45 to 60 minutes after the application of sunlight, the rise in temperature of the Comparative Examples was larger than that of the Examples, and reached a maximum difference in temperature of 16° C. In these experiments, natural sunlight was applied, so that during periods of cloudiness during the experiment, the temperature decreased slightly.

TABLE

| Elapsed Time (min) | Experiment 1 | | Experiment 2 | | Experiment 3 | | Experiment 4 | |
|---|---|---|---|---|---|---|---|---|
| | Example 1 (° C.) | Comparative Example 1 (° C.) | Example 2 (° C.) | Comparative Example 2 (° C.) | Example 3 (° C.) | Comparative Example 3 (° C.) | Example 4 (° C.) | Comparative Example 4 (° C.) |
| 0 | — | — | 15 | 15 | 15 | 15 | 15 | 15 |
| 15 | 25 | 31 | 65 | 80 | 67 | 79 | 67 | 76 |
| 30 | 42 | 54 | 77 | 93 | 78 | 94 | 77 | 93 |
| 45 | 52 | 65 | 80 | 94 | 80 | 93 | 79 | 95 |
| 60 | 53 | 65 | 79 | 96 | 79 | 96 | 80 | 95 |
| 75 | 60 | 74 | 79 | 97 | 80 | 95 | 80 | 96 |

What is claimed is:

1. An infrared reflector having an infrared-reflecting layer and an infrared-permeable layer which is formed on said infrared-reflecting layer, said infrared-reflecting layer having a reflectance of 60% or more and a permeability of 25% or less with respect to infrared rays having a wavelength within a range of 800 to 2600 nanometers, and said infrared-permeable layer having a reflectance of less than 60%, an absorbance of 50% or less, and a permeability of 30% or more with respect to infrared rays having a wavelength within a range of 800 to 2600 nanometers, the sum of said reflectance, said absorbance, and said permeability of said infrared-permeable layer being 100%, said infrared-permeable layer containing resin components and pigments, and an amount of carbon black contained in said infrared-permeable layer being 0.1 wt % or less, wherein said infrared-reflecting layer contains a resin component and one or two or more pigments selected from a group containing iron oxide powder, titanium oxide powder, scaly aluminum powder, stainless steel powder, and mica powder covered with titanium oxide, and an amount of said pigments contained in said infrared-reflecting layer is within a range of 10 to 80 wt %.

2. An infrared reflector in accordance with claim 1, wherein said pigment within said infrared-permeable layer comprises one or two or more selected from a group containing iron oxide pigment, titanium oxide pigment, composite oxide system pigment, titanium oxide-coated mica pigment, iron oxide-coated mica pigment, scaly aluminum pigment, zinc oxide pigment, metallic phthalocyanine pigment, non-metallic phthalocyanine pigment, chlorinated phthalocyanine pigment, chlorinated-brominated phthalocyanine pigment, brominated phthalocyanine pigment, anthraquinone, quinacridone system pigment, diketo-pyrrolipyrrole system pigment, perylene system pigment, monoazo system pigment, diazo system pigment, condensed azo system pigment, metal complex system pigment, quinophthalone system pigment, Indanthrene Blue pigment, dioxadene violet pigment, anthraquinone pigment, metal complex pigment, and benzimidazolone system pigment.

3. An infrared reflector in accordance with claim 1, wherein said pigment within said infrared-permeable layer contains azomethine system pigment and/or perylene system pigment.

4. An infrared reflector in accordance with claim 1, wherein an amount of said pigment in said infrared-permeable layer is within a range of 0.01 to 80 wt %.

5. An infrared reflector in accordance with claim 1, characterized in that said resin component in said infrared-permeable layer comprises one or two or more selected from a group containing alkyd resin, phthalic acid resin, vinyl resin, acrylic resin, fluorine resin, polyamide resin, unsaturated polyester resin, water-soluble resin, chlorinated polyolefin resin, amino resin, polyurethane resin, silicone resin, acrylic-silicone resin, xylene resin, petroleum resin, ketone resin liquid polybutadiene, rosin-denatured maleic acid resin, coumarone resin, ethyl silicate, resin for powdered paints, resin for ultraviolet ray curing, epoxy resin, olefin resin, phenol resin, polyethylene resin, ethylene-vinyl acetate copolymer resin, polypropylene resin, polystyrene resin, AS resin, ABS resin, methacrylic resin, polyvinyl chloride resin, polyamide resin, polycarbonate resin, polyethylene terephthalate resin, polybutylene terephthalate resin, diallylphthalate resin, urea resin, melamine resin, xylene resin, phenol resin, unsaturated polyester resin, epoxy resin, furan resin, polybutadiene resin, polyurethane resin, melamine phenol resin, chlorinated polyethylene resin, vinylidene chloride resin, acrylic-vinyl chloride copolymer resin, AAS resin, ACS resin, polyacetal resin, polymethylpentene resin, polyphenylene oxide resin, denatured PPO resin, polyphenylene sulfide resin, butadiene styrene resin, polyamino bismaleimide resin, polysulfone resin, polybutylene resin, silicone resin, polyethylene tetrafluoride resin, polyethylene fluoride propylene resin, perfluoro alkoxy fluoride plastic, polyvinylidene fluoride resin, MBS resin, methacrylic-styrene resin, polyimide resin, polyallylate resin, polyallylsulfone resin, polyethersulfone resin, and polyether etherketone resin.

6. An infrared reflector in accordance with claim 1, wherein an average grain diameter of said pigment in said infrared-permeable layer is within a range of 0.01 to 30 micrometers.

7. An infrared reflector having an infrared-reflecting layer and an infrared-permeable layer which is formed on said infrared-reflecting layer, said infrared-reflecting layer having a reflectance of 60% or more and a permeability of 25% or less with respect to infrared rays having a wavelength within a range of 800 to 2600 nanometers, and said infrared-permeable layer having a reflectance of less than 60%, an absorbance of 50% or less, and a permeability of 30% or more with respect to infrared rays having a wavelength within a range of 800 to 2600 nanometers, the sum of said reflectance, said absorbance, and said permeability of said infrared-permeable layer being 100%, said infrared-permeable layer containing resin components and pigments, and an amount of carbon black contained in said infrared-permeable layer being 0.1 wt % or less, wherein said infrared reflective layer comprises metal, white glass, white ceramic, or a metal film formed on a surface of a base member, said pigment within said infrared-permeable layer contains an azomethine system pigment and/or a perylene system pigment, and an amount of said pigment in said infrared-permeable layer is within a range of 0.01 to 80 wt %.

* * * * *

UNITED STATES PATENT AND TRADEMARK OFFICE
CERTIFICATE OF CORRECTION

PATENT NO. : 6,366,397 B1  Page 1 of 1
DATED : April 2, 2002
INVENTOR(S) : Yasurhiro Genjima et al.

It is certified that error appears in the above-identified patent and that said Letters Patent is hereby corrected as shown below:

<u>Title page,</u>
Item [73], please add the following Assignee:
-- Origin Electric Company Limited
1-18-1, Takada, Toshima-Ku
Tokyo (JP) --

Signed and Sealed this

Twenty-sixth Day of November, 2002

*Attest:*

JAMES E. ROGAN
*Attesting Officer*  *Director of the United States Patent and Trademark Office*